United States Patent Office 2,704,400
Patented Mar. 22, 1955

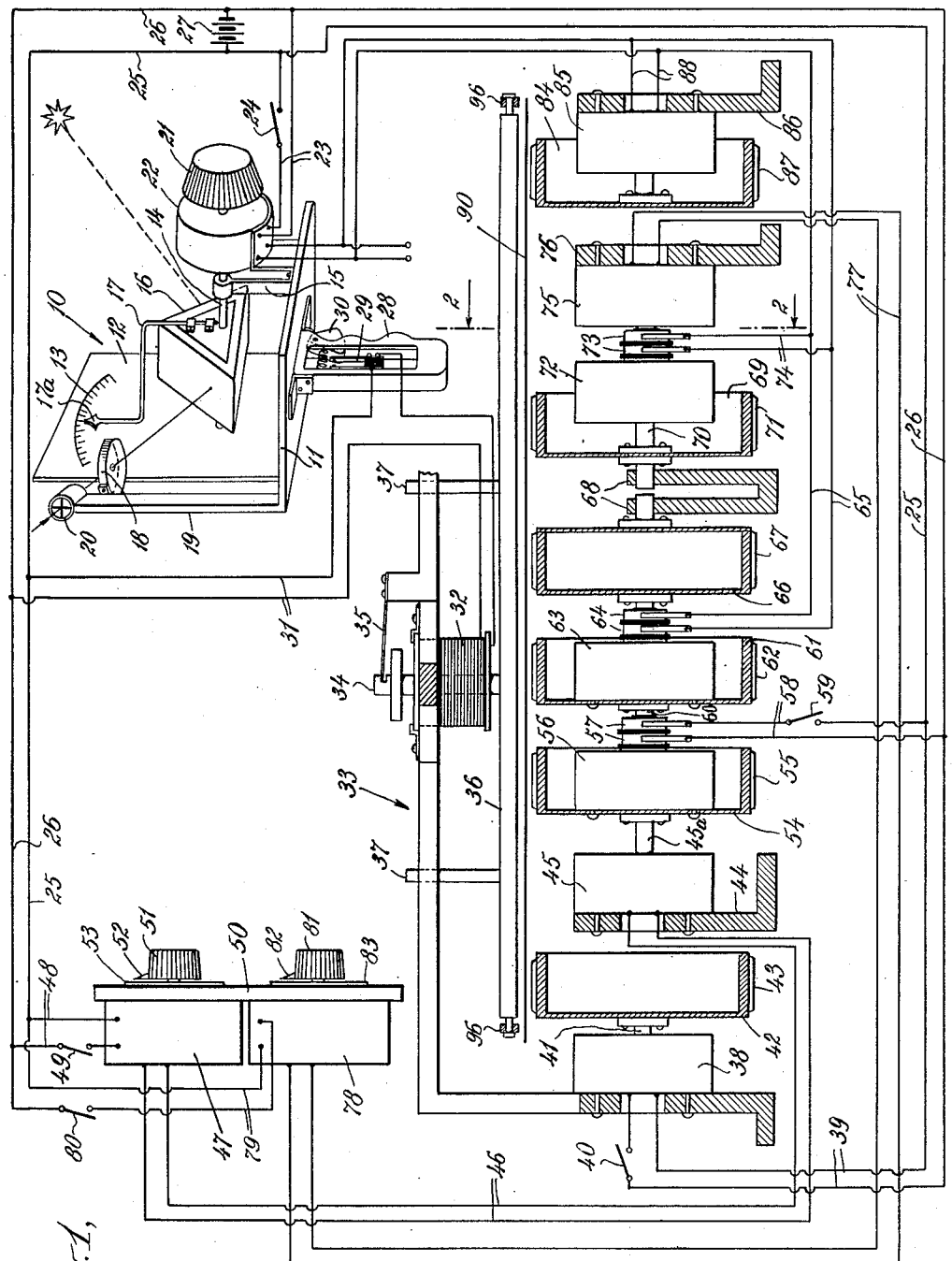

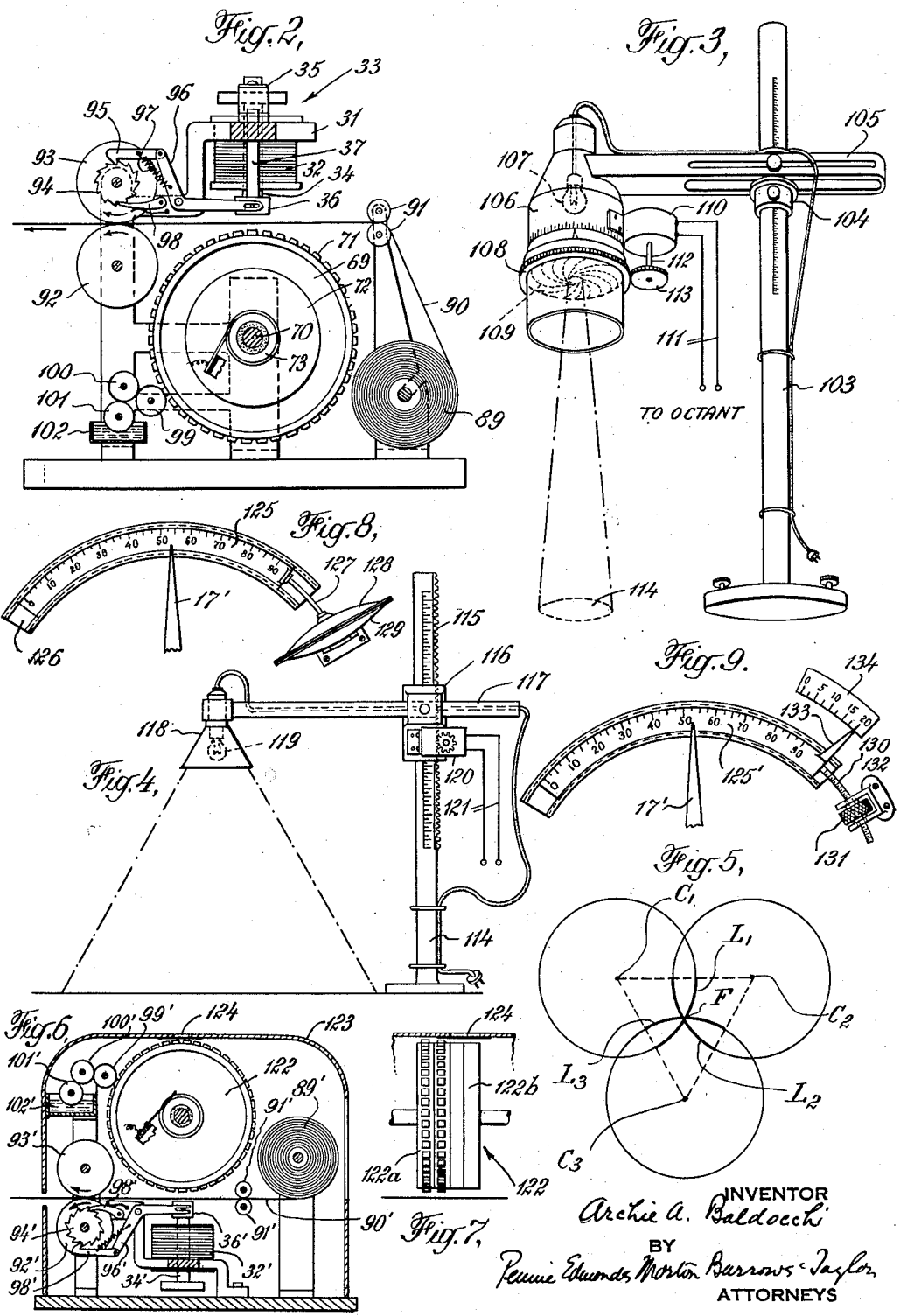

2,704,400

APPARATUS FOR USE IN NAVIGATION

Archie A. Baldocchi, San Salvador, El Salvador

Application May 28, 1952, Serial No. 290,440

5 Claims. (Cl. 33—70)

This invention relates to celestial navigation, in the practice of which the navigator determines his position on or in relation to the earth's surface by ploting lines-of-position on a chart, the information required for plotting such lines ordinarily being obtained by observing stars by an altitude measuring instrument, by noting the times of the observations, and by referring to tabulated data. More particularly, the invention is concerned with a novel apparatus for use in celestial navigation, which automatically provides the navigator with the data required for plotting a line-of-position, when he determines the altitude of a star in the usual way. The use of the new apparatus not only simplifies celestial navigation but also greatly reduces the probability of error, since a navigator using the apparatus need not make notes of the results or times of his observations or consult tables of data. The new system is of simple, inexpensive construction and it is compact and light in weight, so that it is suitable for use on aircraft. The system requires little attention to maintain it in proper operating condition and it is easily adjusted for use.

In celestial navigation as now commonly practiced, the navigator employs an altitude measuring instrument, such as an octant, sextant, etc., a chronometer set to Greenwich civil time, and tables giving the declinations of respective stars, the hour angles of the imaginary reference point called the "first point of Aries," and the hour-angles of the stars relative to the first point of Aries. The altitude measuring instrument, which does not actually measure altitude but the angle between an observed star and the horizon, contains a spirit level with a reticule and an optical system including an angularly adjustable prism and, in the use of the instrument, the observer points it toward the selected star and then, while holding the instrument, so that the bubble of the level is on the reticule, adjusts the prism, until the image of the star is in line with the bubble. He then notes the time of the observation as shown by the chronometer and the angular adjustment of the prism. These operations are repeated for two other stars and, by use of the results of the observations and the tabulated data, the navigator is enabled to plot on the chart circular arcs of appropriate radii with the locations of the stars as centers. Such circular arcs are lines-of-position and their common intersection is the fix, that is, the position of the observer.

In order to reduce the probability of error in present celestial navigation, it is the common practice to record the time at the beginning of the first observation of a star, make eleven observations of the star, record the time at the end of the last observation, and then employ the average altitude and the mean time. It will, accordingly, be apparent that celestial navigation by the method described is difficult and time-consuming and its difficulties, as well as the probability of error, are increased, when it is employed on aircraft flying at high speeds and at high altitudes.

The present invention is, accordingly, directed to the provision of a system for celestial navigation, which reduces the work of the navigator and automatically provides him with the information required for plotting the line-of-position with reference to a star, as that star is observed. In the use of the new system, the navigator adjusts the system for a selected star and then makes the desired number of observations of the altitude of the star by means of an altitude measuring instrument, preferably an octant, forming part of the system. At the instant of each observation or shot, the navigator closes a switch and thereby causes instrumentalities of the system to record the time of the observation and the data required in plotting the line-of-position relative to that star. When the shooting of the star is completed, the navigator utilizes the recorded information in the usual way in establishing a fix. Since the navigator is not required to record either the time of each observation or the altitude of the star observed or to refer to tables or make calculations in order to be able to plot lines-of-position, it will be evident that the use of the new system greatly simplifies celestial navigation and eliminates making notes during observations.

For a better understanding of the invention, reference may be made to the accompanying drawings, in which:

Fig. 1 is a diagrammatic view of an apparatus embodying the invention with parts shown in elevation, perspective, and longitudinal section;

Fig. 2 is a sectional view on the line 2—2 of Fig. 1;

Fig. 3 is a view in perspective of a plotting device, which may form part of the apparatus of the invention;

Fig. 4 is a view in side elevation of a modified form of the plotting device;

Fig. 5 is a diagrammatic view showing the method of establishing a fix by data supplied by the apparatus;

Fig. 6 is a sectional view, similar to Fig. 2, of a modified form of parts of the apparatus;

Fig. 7 is a view, partly in elevation and partly in section, of one of the drums employed in the apparatus of Fig. 6; and Figs. 8 and 9 are fragmentary elevational views of attachments for use on the altitude measuring instrument to correct for variations in the altitude of the craft, on which the apparatus is used.

One form of the apparatus of the invention especially suitable for aerial navigation is illustrated in Fig. 1 as comprising an altitude measuring device generally designated 10 and taking the form of an octant shown diagrammatically. The octant comprises a frame made up of a base 11 and a vertical plate 12, the latter being provided with an arcuate scale 13 extending through 90°. A shaft 14 is mounted for rotation in a bracket 15 attached to base 11 and in a bearing in plate 12, and a prism 16 is fast on the shaft and has attached to it an arm 17 terminating in a pointer 17a traveling along the scale 13. A spirit level 18 is attached to plate 12 and to a standard 19 rising from base 11 and an eyepiece 20, containing a reticule, is mounted on the standard with its axis passing through the spirit level and striking the prism. The shaft carries a knob 21, by which the prism may be rotated, and also the transmitter 22 of an electrical position transmitting mechanism. The transmitter is supplied with current through a branch circuit 23 containing a switch 24 and connected across power lines 25, 26 leading from a source of energy 27.

A handle 28 is attached to the under side of base 11 and a switch 29 is mounted in a recess in the handle. The switch includes a fixed and a movable contact, and the movable contact may be engaged with the fixed contact to close the circuit through the switch by an operating button 30 mounted on the handle and normally held away from the movable contact by a spring. The switch is in a branch circuit 31 with a solenoid 32, and the branch circuit is connected across power lines 25, 26.

The octant is normally employed at an observing station remote from the plotting room and, at an appropriate location within the latter, is placed a housing 33, to the top wall of which the solenoid 32 is attached. The solenoid has an armature 34 normally held in elevated position by a spring 35, and the lower end of the armature is attached to a plate 36 provided with guide rods 37 extending through openings in the top wall of the housing. Beneath the plate 36 are mounted a number of recording devices.

A clock 38 is attached to one end wall of the casing and is driven electrically by power supplied from source 27 through circuit 39 connected to lines 25, 26 and containing switch 40. The clock is of the type which makes one revolution in 24 hours, and it is connected by a shaft 41 to a drum 42. The drum carries printing elements 43 on its periphery, the elements designating the hours and fractions thereof from 0 to 24.

The housing contains a supporting wall 44, to which is attached the receiver 45 of an electrical position transmitting mechanism connected through a circuit 46 with a transmitter 47 supplied with energy from power lines 25, 26 through a branch circuit 48 containing a switch 49. The transmitter 47 is mounted on a plate 50 and its shaft extends through the plate and carries a knob 51, provided with a pointer 52 traveling over a dial 53 mounted on the plate and carrying the names of a number of stars arranged in the sequence, in which they progress relative to the earth, and also at angles corresponding to their sidereal hour-angles. The knob and dial constitute a star selector and, when the pointer is set to a particular star, the accompanying angular movement of the transmitter 47 causes the receiver 45 to move through the same angle.

The receiver 45 has a shaft 45a connected to a drum 54, the periphery of which carries printing elements 55 spelling out the names of the stars in the order in which they appear on dial 53 and the declinations of the respective stars. The printing elements also provide a declination scale. Drums 54 and 42 are of the same size and co-axial.

An electrically driven 24-hour clock mechanism 56 is mounted within drum 54 to rotate therewith and is driven by power supplied through slip rings 57 by a branch circuit 58 connected across the power lines 25, 26 and containing a switch 59. Clock 56 has a shaft 60 carrying a drum 61, which is of the same size as and co-axial with drum 54. Drum 61 carries printing elements 62 on its periphery providing a scale of hour-angle running from 0° to 360° and a longitude scale made up of two parts running from 0° to 180° E. and 0° to 180° W.

The receiver 63 of an electrical position transmitting mechanism is mounted within drum 61 and is connected through slip rings 64 and conductors 65 to transmitter 22 of the octant. The shaft of receiver 63 carries a drum 66, which is co-axial with and of the same size as drum 61 and is provided on its periphery with printing elements 67 forming a longitude scale in two parts, as above described. The end wall of drum 66 opposite to that connected to the shaft of receiver 63 is attached to a shaft mounted for rotation in a supporting member 68 attached to the housing.

A drum 69 of the same size and co-axial with drum 66 has a shaft 70 mounted for rotation in the supporting member 68 and the periphery of the drum carries printing elements 71 providing a latitude scale. The receiver 72 of an electrical position transmitting mechanism is mounted on shaft 70 within drum 69 and is connected through slip rings 73 and conductors 74 to conductors 65 leading to the transmitter 22 of the octant. The shaft of the receiver 72 is connected to that of a second receiver 75 attached to a supporting member 76 within the housing and connected by lines 77 to a transmitter 78 mounted on plate 50 adjacent transmitter 47. Transmitter 78 is supplied with current through branch circuit 79 connected to the main power lines 25, 26 and containing a switch 80. The shaft of transmitter 78 extends through plate 50 and carries a knob 81 having a pointer 82 overlying a dial 83 mounted on plate 50 and carrying a latitude scale covering a range of 0° to 90° N. and 0° to 90° S. and the names of the stars arranged according to their declinations.

A drum 84, which is of the same size as and co-axial with drum 69, is carried by the shaft of a receiver 85 secured to a supporting member 86 within the housing. The periphery of drum 84 carries printing elements 87, forming a scale, which is the same as the scale 13 on the octant. Receiver 85 is connected by lines 88 across lines 65 so as to receive current from the transmitter 22 of the octant.

A supply roll 89 of a record strip 90 is mounted within the housing and the strip is led upwardly from the roll between guide rollers 91 and then passes beneath plate 36, over the tops of the several drums provided with printing elements, and between a pair of feed rollers 92, 93, which grip the strip tightly. The shaft of roller 93 is provided with a ratchet wheel 94 at each end of the roller and each ratchet wheel is engaged by a pawl 95 pivoted on one arm of a bell crank 96. The other end of each bell crank is pivotally attached to a pin at the adjacent end of plate 36. Each pawl 95 is held in contact with the teeth of its ratchet wheel by a spring 97, and the ratchet wheel is prevented from backward movement by a spring-pressed stop pawl 98. With this arrangement, each downward movement of plate 36 resulting from energization of the solenoid 32 causes pawls 95 to advance their ratchet wheels by one tooth and rolls 92 and 93, accordingly, advance the record strip 90 by one step.

The printing elements 43, 55, etc., on the several drums are supplied with ink by a roller 99, which engages the elements and is in contact with a roller 100, which in turn engages a roller 101 dipping within a body of ink within a vessel 102.

In the use of the apparatus so far described, the clock 38 is set accurately at the beginning of the flight and switch 40 is closed to start the clock operating. The clock then drives drum 42 and, at any instant, the printing elements at the top of the drum and in printing position with reference to record strip 90 indicate the correct time.

Also, at the start of the flight, drums 54 and 61 are set to correspond to the relative positions of the celestial and the terrestrial spheres at a given instant of time. For this purpose, drum 54 is set by knob 51 and transmitter 47 and receiver 45 to bring the drum printing elements 55 for a reference point, such as the first point of Aries, or a selected star, into printing position. At the same time and by reference to tabulated data, drum 61 is correspondingly set by clock 56 to the correct hour-angle and longitude of the reference point for the instant of setting, and clock 56 is started. Thereafter, clock 56 maintains drum 61 in proper relation to drum 54 throughout the twenty-four hour cycle and, so long as drum 54 is not moved, the printing elements in printing position on drum 61 show the correct hour-angle and longitude of the reference point at each instant. When drum 54 is shifted by movement of knob 51 in the selection of a desired star to be observed, drum 61 is moved with drum 54 and the printing elements in printing position on drum 61 then show the correct hour-angle and longitude of the selected star, until drum 54 is again shifted.

When the system is operating as described and an observation is to be made, the observer selects the star to be observed by rotating knob 51 so that pointer 52 points to the name of the star on scale 53. The angular movement of receiver 45 with transmitter 47 rotated with the knob brings the printing elements 55 on drum 54 for the name of the star, its tabulated declination, and the corresponding unit of the declination scale into printing position. Similarly, the rotation of clock 56 and drum 61 with drum 54 brings into printing position the printing elements 62 on drum 61 representing the hour-angle and longitude of the star. The observer now makes a shot of the selected star and, for this purpose, he holds the octant, so that the bubble in spirit level 18 appears at the center of the reticule, and adjusts the prism 16 by knob 21, until the image of the star is in line with the bubble. As knob 21 is turned to adjust the prism, transmitter 22 causes receiver 63 in drum 62 to rotate drum 66 through an angle equal to the angular adjustment of the prism by knob 21. Drum 66 is thus moved through an angle less than 90°, and the printing elements 67 in printing position on the drum indicate the longitude of a meridian, to which the observer's line-of-position is tangent. As soon as the prism has been adjusted to the proper position, the observer closes switch 29 to energize solenoid 32 and plate 36 is moved by the plunger of the solenoid to move the record strip against the effective printing elements on drums 43, 54, 61, and 66. A record is thus made on the strip of the time of observation by drum 43, the name and declination of the selected star and the corresponding unit on the declination scale by drum 54, the hour-angle and longitude of the star by drum 61, and the longitude of a meridian, to which the observer's line-of-position is tangent, by drum 66. As the solenoid is energized and plate 36 moved, the record strip is advanced so as to place a blank part of the strip in position to receive the data.

The navigator employs the data printed on the record strip to plot a line-of-position on the chart as follows: He determines the location of the star on the chart by reference to the declination and longitude of the star recorded by drums 54 and 61, and he places one point of a pair of dividers on the star's location and the other on the meridian of longitude indicated by the drum 66. With the location of the star as the center C₁, he inscribes an arc on the chart. The arc is of a line-of-position L₁ and the procedure described is repeated for two other stars, the positions of which are indicated at C₂ and C₃. The intersection of the three lines-of-position L₁, L₂, and L₃, based on the observations of the three stars, establishes the fix F.

The manner, in which the new apparatus functions, will be clear from the following. If the star to be observed has an hour-angle of 120°, the selection of the star by the star selector will cause a movement of drum 61 by receiver 45, so that the longitude scale on drum 61 will indicate 120° W. The movement of drum 61 will cause a corresponding movement of drum 66 by reason of its connection to receiver 63 carried by drum 61. If, at the time of making the observation, the star is directly overhead, the octant will read 90° and the adjustment of drum 66 by the octant acting through receiver 63 will cause drum 66 to give a longitude indication the same as that given by drum 61, namely, 120° W. If, at the time of making the observation, the observer is at a point 10° in any direction from the star, the octant reading will be 80° (the altitude of the star) and the adjustment of the octant for the observation of the star will cause a 10° movement of drum 66, so that the drum will indicate either 110° W. or 130° W., depending on whether receiver 63 is installed to move clockwise or counterclockwise. Both 110° W. and 130° W. are meridians of longitude, to which the observer's line-of-position is tangent, and an arc tangent to either meridian and inscribed on the chart about the position of the star as a center is a line-of-position. Accordingly, the setting of the octant in the observation of a star causes drum 66 to be adjusted to indicate a longitude, which differs from that indicated by drum 61 by the value of the co-altitude (90° minus the altitude) of the star and to which a line-of-position of the observer is tangent.

In some instances, the star observed may be so near the horizon that the location of the star is outside the limits of the chart in use. In such a case, the record made by drum 69 carrying a latitude scale is used. For this purpose, knob 81 is turned to cause pointer 82 to point to the name of the selected star on dial 83 at the same time that the star is selected by turning knob 51. Rotation of knob 81 causes transmitter 78 to move receiver 75 angularly, and drum 69 is correspondingly rotated to bring into printing position printing elements designating the latitude of the selected star. As the observation is being made, the adjustment of the prism by knob 21 and the corresponding rotation of transmitter 22 causes receiver 72 to move drum 69 to bring into printing position printing elements, which indicate the latitude of a parallel, to which the observer's line-of-position is tangent. When switch 29 is then closed, a record of this latitude is printed on record strip 90.

In plotting a line-of-position on the chart based on the observation of a star, the location of which is beyond the limits of the chart in use, the navigator may make use of the plotting devices shown in Figs. 3 and 4. The device shown in Fig. 3 comprises a standard 103, which is to be mounted on the chart table and carries a sleeve 104 adjustable vertically on the standard and carrying an arm 105 connected to the sleeve by a slot and bolt connection so that the arm may be adjusted endwise. At one end, the arm carries a housing 106 for a lamp 107 and a sleeve 108 containing an iris diaphragm 109 is attached to the housing below the lamp. The size of the opening in the diaphragm is adjustable by rotation of sleeve 108 and the sleeve may be rotated manually or by means of a receiver 110 connected by conductors 111 to transmitter 22 operated by knob 21 of the octant, the shaft 112 of the receiver being connected through gearing 113 to sleeve 108. The gearing is so proportioned that, when transmitter 22 is moved during the shooting of a star, diaphragm 109 is opened by rotation of sleeve 108 to pass a beam of light forming an area 114 on the chart, which is circular in form and has a radius equal to the setting of the octant prism as recorded by drum 84. When the diaphragm has been thus adjusted, the navigator adjusts the position of arm 105 on the standard, until the circular area is tangent to the meridian of longitude recorded by drum 66 and the parallel of latitude recorded by drum 69. A line drawn along the circumference of the circular area is one line-of-position and the others required for a fix may be determined by observations of two other stars in the manner set forth above.

Instead of using a light plotter shown in Fig. 3, that employed in Fig. 4 may be used. The plotter shown in Fig. 4 comprises a standard 114 provided with a rack 115. A carriage 116 is movable up and down the standard and carries an arm 117 movable endwise. At one end, the arm carries a housing 118 containing a lamp 119. A receiver 120 is mounted on the standard and its shaft carries a pinion meshing with the rack. The receiver is connected by conductors 121 to transmitter 22 on the shaft of the octant. As the octant is adjusted in the shooting of a star, the arm 117 is moved up and down the standard by the action of receiver 120 and the lighted area on the chart formed by lamp 119 has a radius equal to the setting of the octant prism as recorded by drum 84. In plotting a line-of-position, the arm 117 is adjusted in the same manner as arm 105 of the device shown in Fig. 3, so that the lighted area produced by lamp 119 is tangent to the meridian of longitude recorded by drum 66 and the parallel of latitude recorded by drum 69.

The instrument illustrated in Figs. 1 and 2 makes a record of the time of observation, the name and declination of the selected star, etc. by means of the several printing drums, but, in some instances, it may be desirable to both indicate and record the data. For this purpose, the modified form of the instrument shown in Fig. 6 may be used. This instrument includes drums for the several purposes previously described, and each drum is similar to drum 122 which is in two sections. Section 122a of drum 122 carries printing elements and section 122b carries indicia corresponding to the printing elements and angularly displaced 180° therefrom. The drums are mounted within a casing 123 which contains a roll 89' of a record strip 90' which passes between guide rolls 91' and beneath the drums and above a bar 36' attached to the armature 34' of solenoid 32', which is supplied with power under the control of a switch on the handle of the octant in the same manner as solenoid 32. Beyond bar 36', the strip 90' is gripped by upper and lower rolls 92', 93'. The shaft of roll 92' carries ratchet wheels 94' operated by pawls 98' connected to the ends of respective bell crank levers 96'. The other ends of the bell crank levers engage pins on the ends of bar 36'. Ratchet wheels 94' are held against backward movement by spring-pressed holding pawls 98'. The printing elements on drums 122 are supplied with ink by a roller 99' engaging the elements and contacting with roller 100', which is in contact with a roller 101' dipping into a body of ink within a vessel 102'. Casing 123 has windows 124 lying above the sections 122b of the several drums.

The modified instrument operates in the same manner as that shown in Figs. 1 and 2, except that the record strip is moved upwardly against the printing elements on the drums instead of being moved downwardly. The sections of the drum carrying indicia are visible through windows 124, so that the instrument both indicates and records the navigation data. It will be apparent that, if desired, the printing mechanism including solenoid 32', the inking devices, etc., incorporated in the instrument shown in Fig. 6 may be dispensed with, so that the instrument will merely indicate and not record. Similarly, the solenoid, inking devices, etc., may be omitted from the instrument of Figs. 1 and 2, so that the instrument will merely indicate and not record. If the instrument of Figs. 1 and 2 is thus modified, the printing elements on the drums will be replaced by suitable indicia and the instrument housing will be provided with windows through which the indicia may be read. In the instrument of Figs. 1 and 2 as thus modified, the indicating and recording means are obvious equivalents.

In a form of the navigation apparatus to be used on aircraft operating at high altitudes, it is desirable to compensate for the altitude of the craft. For this purpose, the octant is provided with an arcuate strip 125 bearing a scale similar to scale 13. The strip is movable in guides on a base 126 and the pointer 17' overlies the strip. The strip is connected by a rod 127 to a flexible diaphragm within a housing made up of parts 128, 129. Part 128 of the housing contains air at atmospheric pressure at ground level and the interior of part 129 of the housing is open to the ambient atmosphere. As the aircraft ascends, the pressure in part 129 of the housing decreases and the air contained in part 128 of the housing causes the diaphragm to bulge outwardly. This causes strip 125 to be moved in the guides so that the readings of the pointer 17' on the strip are adjusted for the altitude of the craft.

In the modified construction shown in Fig. 9, the strip 125' is attached to one end of a screw 130, which passes through a nut 131 in a bracket 132, and the strip is provided with a pointer 123 overlying an altitude scale 134. By rotation of the nut 131, the strip 125' can be moved along until pointer 133 indicates the altitude of the craft on scale 134. In the new position of strip 125', the readings by pointer 17' are correct for the altitude of the craft.

I claim:

1. An apparatus for celestial navigation which comprises the combination of an instrument for observing stars and measuring their altitudes, the instrument including a movable element and means for adjusting the element in observing and measuring the altitude of a selected star, means for continuously indicating the instantaneous value of the longitude of any one of a group of stars including the selected star, means for adjusting the indicating means to cause it to indicate the continuous value of the longitude of the selected star, a second longitude indicating means operable by the first longitude indicating means, and means actuated by the element adjusting means, when the latter has adjusted the movable element to a position corresponding to the altitude of a selected star during the observation of said star, to adjust the second longitude indicating means to cause the latter to indicate a meridian of longitude, to which a line-of-position of the observer is tangent.

2. An apparatus for celestial navigation which comprises the combination of an instrument for observing stars and measuring their altitudes, the instrument including a movable element and means for adjusting the element in observing and measuring the altitude of a selected star, a rotary member carrying longitude scales, means for rotating the member at the rate of progression of the stars relative to the earth, means for setting the member to cause it to give a continuous indication of the longitude of one of a group of stars, a second rotary member carrying longitude scales, adjustable means carried by the first member for rotating the second member with the first, and means actuated by said element adjusting means, when the latter has adjusted the movable element to a position corresponding to the altitude of a selected star during the observation of said star, to set said adjustable means to cause the second rotary member to indicate a meridian of longitude, to which a line-of-position of the observer is tangent.

3. An apparatus for celestial navigation which comprises the combination of an instrument for observing stars and measuring their altitudes, the instrument including a movable element and means for adjusting the element in observing and measuring the altitude of a selected star, a rotary member carrying longitude scales, means for rotating the member at the rate of progression of the stars relative to the earth, means for setting the member to cause it to give a continuous indication of the longitude of one of a group of stars, a second rotary member carrying longitude scales, and an electric position transmitting means including a receiver and a transmitter, said receiver being carried by the first rotary member and carrying the second rotary member, and the transmitter being actuated by said element adjusting means, when the latter has adjusted the movable element to a position corresponding to the altitude of a selected star during the observation of said star, to operate the receiver to set the second rotary member to indicate a meridian of longitude, to which a line-of-position of the observer is tangent.

4. An apparatus for celestial navigation which comprises the combination of an instrument for observing stars and measuring their altitudes, the instrument including a movable element and means for adjusting the element in observing and measuring the altitude of a selected star, a rotary drum carrying longitude scales, means for rotating the drum at the rate of progression of the stars relative to the earth, remotely operable means for setting the drum to cause it to give a continuous indication of the longitude of any one of a group of stars, an electrical positioning mechanism including a transmitter actuated by said element adjusting means, when the latter has adjusted the movable element to a position corresponding to the altitude of a selected star during the observation of said star, and a receiver movable by said transmitter, said receiver being mounted on the drum and rotatable therewith, and a second rotary drum carrying longitude scales and supported by said receiver to rotate with the first drum, the second drum being rotatable relative to the first drum by the action of said transmitter during the observation of the selected star to indicate a meridian of longitude, to which a line-of-position of the observer is tangent.

5. An apparatus for celestial navigation which comprises the combination of an instrument for observing stars and measuring their altitudes, the instrument including a movable element and means for adjusting the element in observing and measuring the altitude of a selected star, a rotary member carrying longitude scales, means for setting the member to cause it to give a continuous indication of the longitude of one of a group of stars, a second rotary member carrying longitude scales, a third rotary member carrying latitude scales, means for setting the third rotary member to indicate the latitude of a star of said group, and an electrical position transmitting means including a receiver carried by the first rotary member and supporting the second rotary member for rotation with the first, a second receiver supporting the third rotary member for rotary adjustment therewith, and a transmitter actuated by said element adjusting means, when the latter has adjusted the movable element to a position corresponding to the altitude of a selected star during the observation of said star, to operate the first receiver to set the second rotary member to indicate a meridian of longitude, to which a line-of-position of the observer is tangent, and to operate the second receiver to set the third rotary member to indicate a parallel of latitude, to which a line-of-position of the observer is tangent.

References Cited in the file of this patent

UNITED STATES PATENTS

| | | |
|---|---|---|
| 1,724,118 | Unkles | Aug. 13, 1929 |
| 2,444,933 | Jasperson | July 13, 1948 |
| 2,467,899 | Lowkrantz | Apr. 19, 1949 |
| 2,516,187 | Deimel et al. | July 25, 1950 |

FOREIGN PATENTS

| | | |
|---|---|---|
| 456,744 | Germany | Mar. 2, 1928 |